United States Patent
Parker, Jr.

(10) Patent No.: US 10,262,367 B2
(45) Date of Patent: Apr. 16, 2019

(54) SYSTEM AND METHOD OF INTERFEROMETRIC SECURITIES TRADING, EVENT DETECTION, AND COMMUNICATION

(71) Applicant: Edgar Parker, Jr., Bayside, NY (US)

(72) Inventor: Edgar Parker, Jr., Bayside, NY (US)

( * ) Notice: Subject to any disclaimer, the term of this patent is extended or adjusted under 35 U.S.C. 154(b) by 590 days.

(21) Appl. No.: 14/325,780

(22) Filed: Jul. 8, 2014

(65) Prior Publication Data
US 2016/0012531 A1    Jan. 14, 2016

(51) Int. Cl.
*G06Q 40/04*    (2012.01)

(52) U.S. Cl.
CPC ................... *G06Q 40/04* (2013.01)

(58) Field of Classification Search
CPC ............... G06Q 40/04; G06Q 40/06
USPC .......................................................... 705/37
See application file for complete search history.

(56) References Cited

U.S. PATENT DOCUMENTS

| 8,484,000 B2 * | 7/2013 | Gulati | G06F 19/20 |
| | | | 702/19 |
| 8,635,133 B2 * | 1/2014 | Freer | G06Q 40/04 |
| | | | 705/35 |

* cited by examiner

*Primary Examiner* — Igor N Borissov

(57) ABSTRACT

A system comprising an analog liber optic cable or cables with embedded or attached interferometric detectors along its length configured to detect a predetermined security trading opportunity by interferometric constructive or destructive interference. Upon detection of the predetermined trading opportunity the system is configured to send trading instructions to the opposite ends of the fiber optic network and to translate those trading instructions from analog to digital encoding.

3 Claims, 4 Drawing Sheets

SYSTEM AND METHOD OF INTERFEROMETRIC SECURITIES TRADING, EVENT DETECTION, AND COMMUNICATION

CROSS-REFERENCE TO RELATED APPLICATIONS

The present application claims the benefit under 35 U.S.C. sctn. 119(e) of U.S. Provisional Application Ser. No. 61/843536, filed Jul. 8, 2013, entitled "System and Method of Interferometric Securities Trading, Event Detection, and Communication," which as incorporated herein by reference in its entirely.

BACKGROUND OF THE INVENTION

Field of the Invention

The present invention relates to a system and method of interferometric securities trading, securities trading event detection, and securities trading communication.

BRIEF SUMMARY OF THE INVENTION

A system comprising an analog fiber optic cable or cables with embedded or attached interferometric detectors along its length configured to detect a predetermined security trading opportunity by interferometric constructive or destructive interference. Upon detection of the predetermined trading opportunity the system is configured to send trading instructions to the opposite ends of the fiber optic network and to translate those trading instructions from analog to digital encoding.

BRIEF DESCRIPTION OF THE SEVERAL VIEWS OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Figure 1:
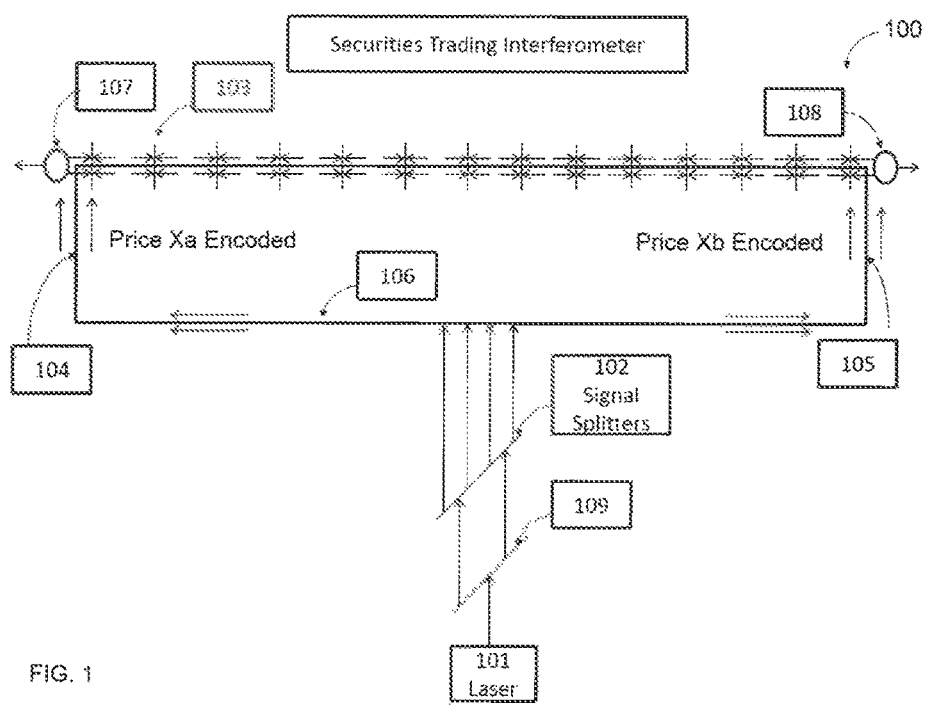
FIG. 1 is an illustrative diagram of process 100 which is an exemplary laser optical interference first sight multiple node interferometric securities trading device in accordance with some embodiments of the present disclosure.

The present invention makes of the interference of electromagnetic signals to make the detection and communication of securities trading events. The detection device is composed of at least two signal input points, and at least one node (where nodes are described as a combination of at least one photodetector, phototransmitter, and at least one amplitude and/or frequency detectors). Once detected at a node or nodes, the trading events can then be rapidly communicated to the ends of the detection device where this communication may or may not be converted to a digital encoding format for export. These signals may take the form of laser light along a fiber optic network, or other networks based upon microwave, ultraviolet, or any other type of electromagnetic signal. For example, the possibly divergent prices of the same security from separate markets are encoded in electromagnetic signals which are interfered with on another. The encoding may be accomplished by amplitude or frequency modulation of a simple baseline amplitude and/or constant frequency signal, a combination of modulation of the two, or by other encoding techniques. The resultant signal may or may not be compared with baseline interfered signals that have not been encoded with the price information. The interference is accomplished at one or more interferometric nodes (More than one interferometric node may be linked along a fiber optic network or other type of network depending on the electromagnetic spectrum and type of network utilized, and may also implement a "first site" trading event strategy as described later).

Rapid analysis of the combined interference resultant signal leads to a determination of whether a trading condition exists or not. This analysis could be performed by a simple measurement of a quantity or dimension such as but not limited to the amplitude of the resultant interfered signal. If the amplitude is greater than a predetermined magnitude then the trading condition has been met in this simple example. Specifically in the case of simple arbitrage, the comparison determines whether the prices are separated enough to warrant a profitable arbitrage trading event. In this specific case one amplitude modulated price signal is interfered with the amplitude modulated inverse of the price of the same commodity security. If the resultant amplitude exceeds a predetermined magnitude then a trading event has been detected.

After detection of a trading event by measuring the amplitude separation, as described above, the separation from zero amplitude is measured for each signal. The price signal with the lowest relative amplitude (closest to zero) is designated the "Buy" market signal, and the signal with the highest relative amplitude (greatest from zero) is designated the "Sell" market signal. These price comparisons can be done more quickly than with a standard microprocessor by using interferometric detection and the amplitude detectors (Note similar analysis can be done utilizing frequency modulation and more complex encoding techniques).

Once the trading event detection and buy/sell designations have occurred an analog and/or digital signal may be sent to the ends of the interferometric trading device for possible output to other systems. At these ends the analog and/or digital trading signal may be used to trigger a preprogrammed standard digital trading signal for export.

If the trading event is detected at one of the interferometric nodes then signals are sent to the endpoint nodes. Transmission of the trading event can be sent from the endpoint nodes using typical digital encoding. The node that first witnesses the trading event may also be configured to stop transmission of the encoded and nonencoded signals to the next node in the interferometer thereby stopping additional trades being made with the same signal. Note this analog system will be faster than a system using typical servers and computers and digital transmission of prices (Since it is analog the transmission speeds will be closer to the phase speed than a digital system).

The communication network could take many forms although a laser fiber optic network is focused on in this description. The specific method or form of communication that the network or networks use does not change the logic of trading method presented in this work. These various forms include but are not limited to a fiber optic cable network, a microwave relay network, a laser network, and relay or other types of networks based on other electromagnetic wavelengths, a mixture of various network types, or servers and processors linked by any other means that allows communication between the elements of the network and trading centers.

The intermediate interferometric node or nodes could communicate by microwave or other wavelengths using antennas, satellites, UAV drone relay link, intermediate point or relay point on a fiber optic cable, or linked servers on a distributed network. Miniaturized or even nanoscale servers and processors could be embedded directly in the communications link. Such embedding could occur at many points in the structure of the communication link such as in a fiber optic or wire network. Coupled photodetectors and transmitters designed to measure the interference of laser waves embedding price information from and communicating back trades of securities to the markets could also be utilized as nodes.

The laser fiber optic interferometers may be of the standard but not limited to the Fabry-Perot, Mach-Zehnder, Michelson, and Sagnac type fiber optic interferometers. These laser fiber optic interferometers can be embedded or external to the actual fiber optic link and are often described as intrinsic and extrinsic respectively.

Other researchers have developed methods of optimally placing an intermediate trading node or server at a point between trading centers based on the characteristics of the communication network and the securities being traded (Wissner-Gross and Freer 2010). The optimal location or server is computed using this information. Trading signals are received from and sent to each trading center from this optimal location.

However, this method may be impractical or its results unstable. Characteristics of the communication network or link between the trading centers may change over time. Additionally the relevant characteristics of the traded securities can also change. These changes can occur rapidly and constantly and thus continuously alter the optimal trading location. One would need to constantly update the trading location to trade from the hypothesized optimal position using these methods of the prior art.

Also, as the characteristics of both the communication link and the traded securities evolve over time the optimal trading point will also move. Depending on the particular communication link and the securities involved this change in position could be dramatic and happen over short time scales. This movement in optimal position will mean that many optimal trading opportunities will be potentially missed as new optimal trading locations replace the past optimal locations. Additionally, these changes may necessitate the costly and or impractical physical movement of the trading center to newly computed optimal points. Finally, the true "optimality" of the trading center using such a method will depend on the accuracy of the model and computations used.

In contrast the interferometric method of the present invention relies upon the simplifying assumption that a true optimal trading site from among many in along a communication link is the first site or sites that witness the trading event. Where the trading event is described as the sufficient separation of the price of the same commodity at distant markets. This sufficient separation will allow arbitrage between the markets. This method automatically decides the optimal point (or closest or most optimal node or nodes among many). Computations, modeling, and the potential errors of other methods are not necessary, and neither is the potentially costly movement to a newly computed optimal location from a previously computed optimal location.

FIG. 1 presents the Securities Trading Interferometer in process 100. The laser 101 sends a laser signal along fiber optic cables 106. Signal splitters 102 and 109 split the beam into multiple beams. At least 4 beams are created. Two beams will be encoded at 104 and 105 with price information about a security or securities. This encoding may be done through amplitude or frequency modulation or through another encoding technique. The other two beams will not be encoded and will serve as a base to compare with the encoded beams. In this presentation amplitude modulation will be assumed (Other types of encoding such as frequency modulation may be utilized without changing the basic description of the invention). The encoded and nonencoded signals travel along the fiber optical cable or cables designated 106 in opposite directions. Specifically, one encoded signal travels clockwise and the other encoded signal travels counterclockwise along the fiber optic cable or cables. Similarly, one nonencoded signal travels clockwise and the other nonencoded signal travels counter clockwise. The coded signals are combined and interfered at each node 103 along the fiber optic cable or cables. Similarly, the noncoded signals are combined and interfered at each node 103 along the fiber optic cable or cables. The interfered encoded resulting signal is compared with the nonencoded interfered signal to determine if a trading condition has been met. If the condition has been met, then trading signals are sent to endpoint nodes 107 and 108 where they are converted into standard digital trading signals for transmission outside of the Securities Trading Interferometer.

Figure 2:
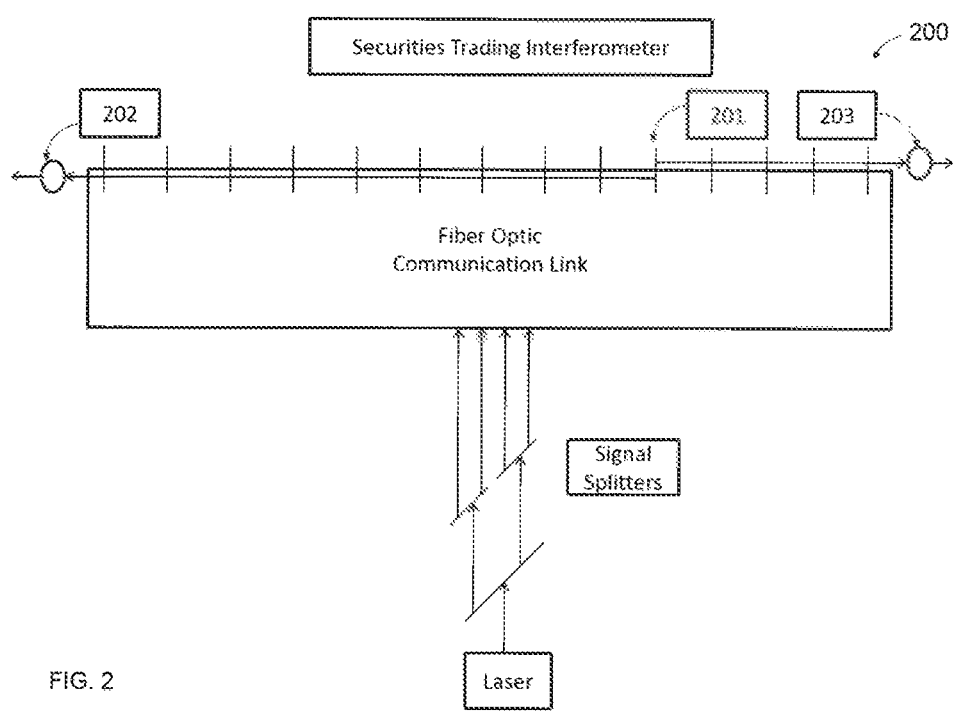
FIG. 2 is an illustrative diagram of process 200 which is an exemplary laser optical interference first sight multiple node interferometric securities trading device in accordance with some embodiments of the present disclosure.

FIG. 2 shows the results of an interferometrically determined trading event in process 200. The event is detected at node 201 and trading signals are sent to endpoint nodes 202 and 203 where they are converted into standard digital trading signals for transmission outside of the Securities Trading Interferometer.

Figure 3:
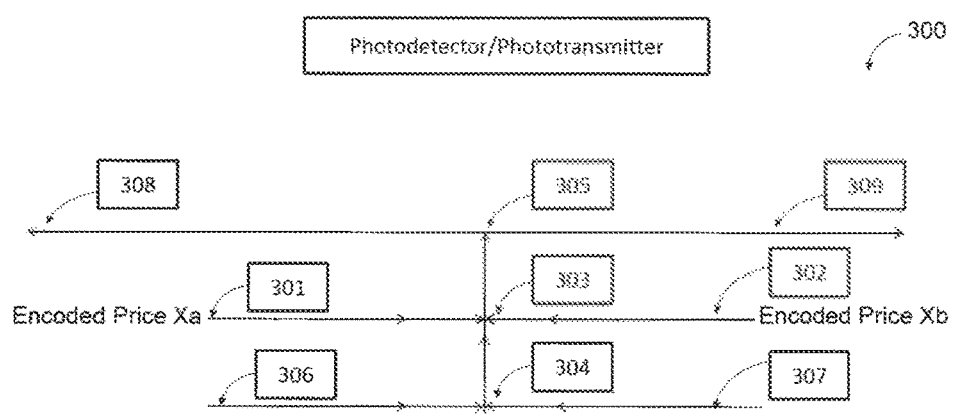
FIG. 3 is an illustrative diagram of process 300 which is an exemplary photodetector and phototransmitter interferometric node in accordance with some embodiments of the present disclosure.

FIG. 3 shows detail of nodes 103 of process 100. Encoded signals 301 and 302 arrive by fiber optic cable and are combined and interfered at 303. Similarly, unencoded signals 306 and 307 arrive and are combined and interfered at 304. The resultant interfered signals are compared at 305 to determine whether a trade event has been detected. If the event has been detected a trading signals are sent along 308 and 309 to the endpoint nodes described in processes 100 and 200.

Figure 4:
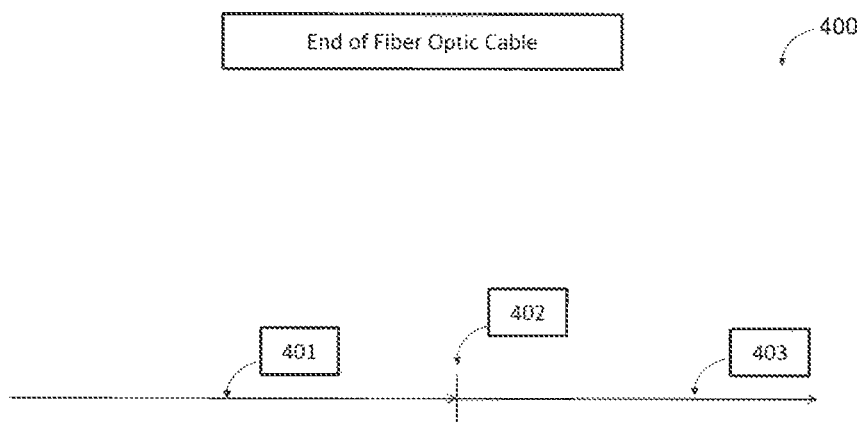
FIG. 4 is an illustrative diagram of process 400 which is an exemplary endpoint of the interferometric securities trading device.

FIG. 4 shows detail of endpoint nodes 107 and 108 in process 100, and 202 and 203 in process 200 respectively in process 400. The trading signal sent by the interferometric detector that detected the trade air by fiber optic cable 401 at translator 402. Upon receipt of the signal from 401 the translator sends a digital or analog signal outside the Securities Trading Interferometer.

What is claimed is:
1. A system comprising:
    at least one fiber optic cable with periodically embedded interferometers along its length;
    at least one of a laser or light frequency emitter;
    a laser signal reflector, a splitter, and an amplifier;
    where a first light signal at a first part of the at least one fiber optic cable nearest a first security market has a price of a security at the first security market encoded by amplitude and/or frequency modulation of the first light signal and projected from the first part through the at least one fiber optic cable towards a second part of said cable nearest a second security market, the second security market is different from the first security market, the first light signal is passing through the intervening fiber optic interferometers and combined with a second light signal projected from the second part of the at least one fiber optic cable, the second light signal has a price of the security at the second market encoded by the amplitude and/or frequency modulation of the second light signal and projected from the second part through the at least one fiber optic cable, thereby producing at a detecting interferometer at least one of interferometric constructive or destructive interference of the combined light signals, wherein the system is configured to calculate the emergence of a predetermined security trading condition by the measurement of a magnitude of the at least one of interferometric constructive or destructive interference of combined light signals.

2. The system of claim 1, wherein the constructive and/or destructive interfered light signal with amplitude and/or frequency of a predetermined strength triggers at least one of analog or digital trading buy or sell signal to the first or second parts of the at least one fiber optic cable.

3. The system of claim 2, wherein the at least one of analog or digital trading signal is digitally encoded at the location of at least one of the detecting interferometer, the first part of the at least one fiber optic cable, or the second part of the at least one fiber optic cable.

* * * * *